(12) United States Patent
Corbus

(10) Patent No.: US 10,695,774 B2
(45) Date of Patent: Jun. 30, 2020

(54) CENTRIFUGE SEPARATOR FOR GOLD MINING AND RECOVERY

(71) Applicant: Richard F Corbus, Miami, OK (US)

(72) Inventor: Richard F Corbus, Miami, OK (US)

( * ) Notice: Subject to any disclaimer, the term of this patent is extended or adjusted under 35 U.S.C. 154(b) by 23 days.

(21) Appl. No.: 16/350,485

(22) Filed: Nov. 20, 2018

(65) Prior Publication Data

US 2019/0151863 A1 May 23, 2019

Related U.S. Application Data

(60) Provisional application No. 62/589,342, filed on Nov. 21, 2017.

(51) Int. Cl.

| | | |
|---|---|---|
| *B04B 7/14* | (2006.01) | |
| *B04B 9/02* | (2006.01) | |
| *B04B 11/06* | (2006.01) | |
| *C22B 11/00* | (2006.01) | |
| *B04B 9/12* | (2006.01) | |
| *C22B 7/00* | (2006.01) | |
| *B04B 11/02* | (2006.01) | |
| *B04B 15/06* | (2006.01) | |

(Continued)

(52) U.S. Cl.
CPC ................. *B04B 7/14* (2013.01); *B04B 1/00* (2013.01); *B04B 1/04* (2013.01); *B04B 7/08* (2013.01); *B04B 9/02* (2013.01); *B04B 9/12* (2013.01); *B04B 11/02* (2013.01); *B04B 11/06* (2013.01); *B04B 15/06* (2013.01); *C22B 7/005* (2013.01); *C22B 11/00* (2013.01)

(58) Field of Classification Search
CPC .. B04B 7/14; B04B 15/06; B04B 7/08; B04B 1/00; B04B 9/02; B04B 11/06; B04B 9/12; B04B 11/02; B04B 1/04; C22B 11/00; C22B 7/005
USPC ......... 494/46, 80, 60, 27–30, 62; 210/360.1, 210/380.1
See application file for complete search history.

(56) References Cited

U.S. PATENT DOCUMENTS

| | | | |
|---|---|---|---|
| 556,567 A * | 3/1896 | Waring ..................... | B04B 1/00 |
| | | | 494/80 |
| 881,013 A * | 3/1908 | Manley ..................... | B04B 1/00 |
| | | | 494/47 |

(Continued)

FOREIGN PATENT DOCUMENTS

| | | | | |
|---|---|---|---|---|
| WO | WO-9313864 A1 * | 7/1993 | ............... | B04B 1/02 |
| WO | WO-9637307 A1 * | 11/1996 | ............... | B04B 1/00 |

(Continued)

*Primary Examiner* — Charles Cooley
(74) *Attorney, Agent, or Firm* — Randal D. Homburg

(57) ABSTRACT

A centrifuge separator device for use in mining gold ore receives bulk quantities of gold bearing materials through a port in a central vertical pipe, diverting the materials through a series of rotating baffles into a multi-tiered bowl, with a variable speed bowl drive system turning the bowl and the baffles at a selected speed while framework, including a channeled bin, gussets and a plurality of blades extending a plurality of upper and lower cutters, remains stationary, forcing the materials to separate by density, forcing the lighter materials up and over the rotating bowl into a channeled bin for further disposal through an exit port in the channeled bin, leaving the heavier gold bearing ores in the lower part of the bowl for collection and further classification.

9 Claims, 7 Drawing Sheets

(51) Int. Cl.
 B04B 7/08 (2006.01)
 B04B 1/04 (2006.01)
 B04B 1/00 (2006.01)

(56) References Cited

U.S. PATENT DOCUMENTS

| | | | | |
|---|---|---|---|---|
| 980,001 A * | 12/1910 | Ponten | B04B 1/12 | 494/35 |
| 1,283,846 A * | 11/1918 | Mark et al. | B04B 7/02 | 494/60 |
| 1,473,421 A * | 11/1923 | Eccleston | B03B 5/32 | 494/29 |
| 1,542,747 A * | 6/1925 | Verney | B04B 11/04 | 494/58 |
| 1,557,672 A * | 10/1925 | Doerner | C22B 11/10 | 209/199 |
| 1,590,584 A * | 6/1926 | Logan | B04B 5/00 | 494/42 |
| 1,594,501 A * | 8/1926 | Eccleston | B04B 1/00 | 494/29 |
| 1,684,870 A * | 9/1928 | Lewis | C22B 11/10 | 209/199 |
| 1,828,096 A * | 10/1931 | Bryson | B04B 1/00 | 494/37 |
| 1,853,249 A * | 4/1932 | Ainlay | B07B 7/08 | 494/43 |
| 1,981,924 A * | 11/1934 | Reese | B04B 1/00 | 494/56 |
| 2,022,926 A * | 12/1935 | Schlank | B03B 5/32 | 494/32 |
| 2,112,099 A * | 3/1938 | Ballou | | 494/67 |
| 2,133,271 A * | 10/1938 | Brintnall | C22B 11/00 | 209/14 |
| 2,140,388 A * | 12/1938 | Lucas | B04B 1/04 | 494/80 |
| 2,179,807 A * | 11/1939 | Asmussen | B03B 5/32 | 494/27 |
| 2,199,847 A * | 5/1940 | Bryson | B04B 1/00 | 494/44 |
| 2,272,675 A * | 2/1942 | Knudsen | B04B 7/08 | 494/45 |
| 2,472,475 A * | 6/1949 | Hamilton | C22B 11/10 | 209/199 |
| 2,585,753 A * | 2/1952 | Drury | B04B 7/08 | 494/45 |
| 2,649,202 A * | 8/1953 | Jones | B01D 11/02 | 209/159 |
| 2,688,437 A * | 9/1954 | Monnet | B03B 5/32 | 494/26 |
| 2,782,925 A * | 2/1957 | Morton | B04B 1/18 | 494/27 |
| 3,595,470 A * | 7/1971 | Shapiro | B04B 11/043 | 494/5 |
| 3,829,009 A * | 8/1974 | Peck | B04B 11/02 | 494/11 |
| 3,963,175 A * | 6/1976 | Daubman | B04B 11/06 | 494/74 |
| 4,032,122 A * | 6/1977 | Anders | C22B 11/10 | 266/169 |
| 4,286,748 A * | 9/1981 | Bailey | B04B 1/02 | 209/453 |
| 4,289,270 A * | 9/1981 | Warsinske | B04B 1/02 | 494/27 |
| 4,361,480 A * | 11/1982 | Corbus | B03B 5/02 | 209/453 |
| 4,515,689 A * | 5/1985 | Vivier | B04B 1/00 | 209/453 |
| 4,608,040 A * | 8/1986 | Knelson | B04B 1/00 | 209/453 |
| 4,776,833 A * | 10/1988 | Knelson | B04B 15/10 | 494/27 |
| 4,824,431 A * | 4/1989 | McAlister | B04B 1/00 | 494/43 |
| 4,846,781 A * | 7/1989 | Knelson | B04B 1/00 | 494/27 |
| 4,891,041 A * | 1/1990 | Hohmann | A61C 17/065 | 494/62 |
| 4,932,933 A * | 6/1990 | Becker | B04B 1/02 | 494/62 |
| 4,981,219 A * | 1/1991 | Burnell | B03B 5/00 | 209/210 |
| 4,983,156 A * | 1/1991 | Knelson | B04B 1/00 | 494/28 |
| 5,087,127 A * | 2/1992 | Knelson | B04B 11/08 | 494/29 |
| 5,222,933 A * | 6/1993 | Knelson | B04B 1/00 | 210/377 |
| 5,230,797 A * | 7/1993 | Knelson | B04B 7/08 | 209/453 |
| 5,338,284 A * | 8/1994 | Knelson | B04B 1/00 | 494/28 |
| 5,354,256 A * | 10/1994 | Knelson | B04B 1/00 | 209/453 |
| 5,368,541 A * | 11/1994 | Knelson | B03B 5/00 | 494/29 |
| 5,372,571 A | 12/1994 | Knelson | | |
| 5,462,513 A * | 10/1995 | McAlister | B04B 1/00 | 494/56 |
| 5,586,965 A * | 12/1996 | Knelson | B04B 1/00 | 494/29 |
| 5,601,523 A * | 2/1997 | Knelson | B04B 1/00 | 494/29 |
| 5,601,524 A * | 2/1997 | Knelson | B04B 1/00 | 494/29 |
| 5,713,826 A * | 2/1998 | West | B04B 1/02 | 494/45 |
| 5,728,039 A * | 3/1998 | Knelson | B04B 1/00 | 494/29 |
| 5,895,345 A * | 4/1999 | Knelson | B04B 1/00 | 494/29 |
| 6,095,965 A * | 8/2000 | Eiderman | B04B 1/00 | 494/26 |
| 6,149,572 A * | 11/2000 | Knelson | B04B 1/00 | 210/781 |
| 6,244,446 B1 * | 6/2001 | Schmittel | B03B 5/00 | 209/132 |
| 6,740,027 B1 * | 5/2004 | Benson | B04B 9/10 | 494/29 |
| 6,796,934 B1 * | 9/2004 | McAlister | B04B 1/00 | 494/56 |
| 6,986,732 B2 * | 1/2006 | Zonneveld | B04B 11/06 | 494/29 |
| 6,997,859 B2 * | 2/2006 | Peacocke | B03B 5/32 | 494/29 |
| 7,144,360 B2 * | 12/2006 | Zonneveld | B04B 1/00 | 494/29 |
| 7,300,396 B2 * | 11/2007 | Pitkamaki | B04B 9/04 | 494/15 |
| 7,500,943 B1 * | 3/2009 | Peacocke | B04B 1/00 | 494/29 |
| 7,503,888 B1 * | 3/2009 | Peacocke | B04B 1/00 | 494/29 |
| 7,527,587 B2 * | 5/2009 | Laughlin | B04B 1/00 | 210/377 |
| 8,020,498 B2 * | 9/2011 | Cavaliere | F23G 5/02 | 110/216 |
| 8,808,155 B2 * | 8/2014 | Zonneveld | B04B 7/08 | 494/29 |
| 2006/0194685 A1 * | 8/2006 | Lewis-Gray | B04B 11/02 | 494/33 |
| 2008/0280746 A1 * | 11/2008 | McAlister | B03B 5/32 | 494/8 |
| 2010/0240513 A1 * | 9/2010 | McAlister | B04B 1/00 | 494/37 |
| 2017/0043357 A1 * | 2/2017 | Sherman | B04B 5/0442 | |
| 2017/0312762 A1 * | 11/2017 | Hershberger | B04B 1/00 | |
| 2018/0304277 A1 * | 10/2018 | Heinrichs | B03B 5/32 | |
| 2019/0060914 A1 * | 2/2019 | McAlister | B01D 21/262 | |
| 2019/0151863 A1 * | 5/2019 | Corbus | B04B 1/00 | |

(56) References Cited

U.S. PATENT DOCUMENTS

FOREIGN PATENT DOCUMENTS

| WO | WO-2006111008 A1 | * | 10/2006 | ............... | B03B 5/32 |
| WO | WO-2008049212 A1 | * | 5/2008 | ............. | B04B 15/12 |

* cited by examiner

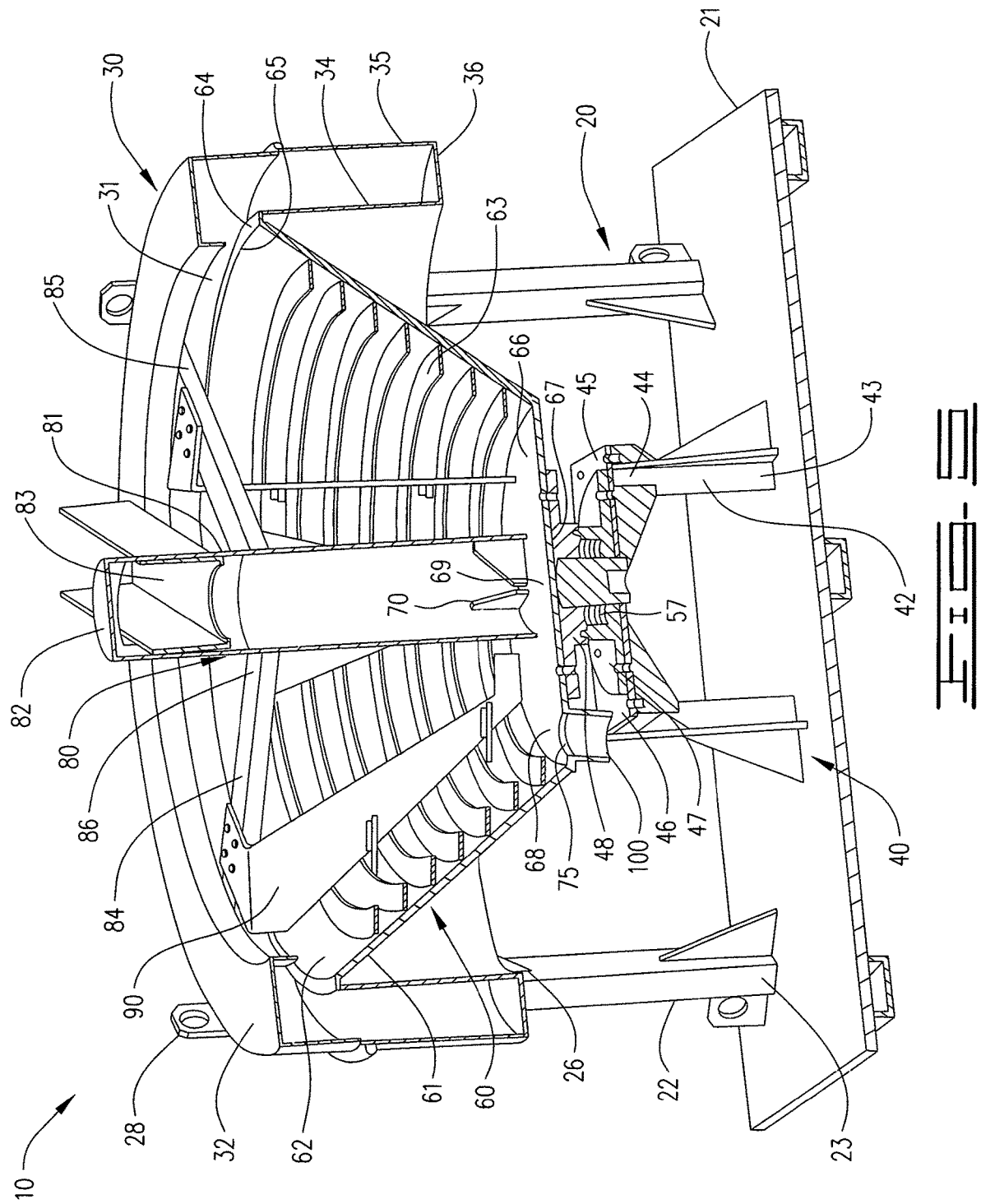

CENTRIFUGE SEPARATOR FOR GOLD MINING AND RECOVERY

CROSS REFERENCE TO RELATED APPLICATIONS

Applicant Claims the benefit of Provisional Patent Application No. 62/589,342, filed by the same Inventor on Nov. 21, 2017.

I. BACKGROUND OF THE INVENTION

1. Field of Invention

A centrifuge separator for use in mining gold ore receives bulk quantities of gold bearing materials through a port in a central vertical pipe, diverting the materials through a series of rotating baffles into a multi-tiered bowl, with a variable speed bowl drive system turning the bowl and the baffles at a selected speed while framework, including a channeled bin, gussets and a plurality of blades extending a plurality of upper and lower cutters, remains stationary, forcing the materials to separate by density, forcing the lighter materials up and over the rotating bowl into a channeled bin for further disposal through an exit port in the channeled bin, leaving the heavier gold bearing ores in the lower part of the bowl for collection and further classification.

2. Description of Prior Art

A preliminary review of prior art patents was conducted by the applicant which reveal prior art patents in a similar field or having similar use. However, the prior art inventions do not disclose the same or similar elements as the present centrifuge separator, nor do they present the material components in a manner contemplated or anticipated in the prior art.

Several prior art patents involve centrifugal separators used for gross classification of gold bearing ores. In an earlier patent, the present inventor and his late father received U.S. Pat. No. 4,361,480 to Corbus, which provided an upward and outward tapered bowl suspended within a frame, the bowl having a plurality of inner ridge extensions and a central material insertion tube which directed raw materials into the flat surfaced bottom of the bowl, a plurality of upward baffles within the insertion tube extending upward from the flat surfaced bottom to spread materials as they exited the tube into the bottom of the bowl, and a plurality of elongated baffles directed at a downward angle conforming to the angle of the inner surface of the bowl, the baffles extending from a series of fixed struts over the top of the bowl by the frame. The lighter materials were spun and directed upward and outward over the top end of the bowl into an upper trough, which transferred the lighter materials and water into the trough as the bowl is spun, the transfer of the water and lighter materials caused as a result of the centrifugal forces applied to the spinning bowl. The scientifically sound concept was to spin the materials to cause separation by specific gravity of the materials with a hope of retaining the heavier gold in the bottom of the bowl while the lighter non-gold and water were compelled outward and upward for disposal, leaving only the gold laden materials behind for retrieval and further classification to retain the gold and dispose of the further non-gold. This was a wet gold mining device with water being an essential part of the processing.

A majority of these patents are issued to Benjamin Knelson or his corporation Knelson Patents, Inc. Beginning with U.S. Pat. No. 4,608,040, which discloses a frame comprising a bowl that rotates about its axis and includes a plurality of axially spaced, radially extending rings formed on the inner surface of an inner portion of the bowl, the inner surface being outwardly tapered as it extends from bottom to top. The bowl also provides an outer portion integrated with the inner portion. Gross materials are deposited through a central tube into the center of the bottom of the bowl onto an arched bottom of the bowl as the bowl in rotated. Water is sprayed against the rotation of the bowl. The bowl directs the lighter granular components up and over the edges of the bowl into a trough for evacuation, leaving the heavier gold bearing components in the bottom of the bowl where they are maintained until being drained from the bottom of the inner and outer portion of the bowl for collection and further classification to recover the gold particles. A flat chute with a ramp is provided in the trough, which appears to provide for an angular channel around the bowl.

A belt drive is disclosed to rotate the bowl. In U.S. Pat. No. 4,846,781 to Knelson, the centrifugal separator defines wedge shaped extension into the inner surface of the bowl instead of flat rings and a downward angled chute. In U.S. Pat. No. 4,983,156 to Knelson, the bowl defines a lower tapered portion with no inner extensions and an upper flat portion with inward extensions which define annular membrane portions spaced axially and separated by radial rings extending from the surface to support the metal bowl, the membranes being deflated or retracted to gradually form annular cups for receiving the separated metals. The membranes are inflated to discharge the collected materials while the feed is temporarily halted and the bowl continues to rotate. Knelson then modifies the bowl in U.S. Pat. No. 5,338,284 to create different shaped rings and dual level evacuation chutes with individual injection of water directed between the rings to increase fluid in the rotating bowl and remove particles between the rings. The dual level chutes direct waste which becomes disposed over the top of the bowl and the gold bearing materials out of the other chute which is collected through pinch valves temporarily opened between the rings to restrict discharge of the gold bearing materials to predetermined time periods. In U.S. Pat. No. 5,372,571 to Knelson, the bowl provides for a permanent opening in the bottom of the bowl which allows the gold bearing materials to flow out the bottom of the bowl when rotation is ceased, with the lighter non-gold bearing materials disposed up and over the bowl when it is rotating. Fluidized recesses are included in U.S. Pat. No. 7,144,360 to Knelson, while U.S. Pat. No. 6,986,732 to Zonneveld, and assigned to Knelson Patents, Inc., defines a plurality of stationary "vanes" and irregular shaped bowl extensions, the conical shaped vanes intended to provide additional stirring of the bowl contents during rotation, with an additional deflector plate lying underneath a hole in the bottom surface of the bowl intersecting with the height of the vanes.

Most recently, Knelson's catalogue includes U.S. Pat. No. 7,503,888 to Peacocke which defines a completely different configuration of the interior portion of the bowl defining a conical lead in wall to a single or paired V-shaped recesses, the base containing a plurality of angularly spaced valve controlled discharge ducts each defining a mouth projecting through the base into the interior of the bowl for discharging heavier particles continuously and a lead-in surface stepped to cause tumbling of the flowing feed materials. Each recess contains a concentrator ring projecting into the recess toward the base to reduce the amount of concentrate in the recess.

None of the Knelson patents or other prior art patents disclose an improved wet mining centrifugal separation device, with improvements comprising an introduction tube similar to the present centrifugal separator device having internally directed particle baffles to break down raw materials and create a turbulence and compel the raw materials outward through the base of the introduction tube, fixed bladed with the plurality of integrated spaced cutters which are directed between a plurality of inwardly projecting rings within the inner surface of the bowl to remove materials between the concentric rings for redeposit within the base of the rotating bowl, the same type of bowl configuration or disposal channel, the integrated fixed upper loading chute, the disclosed support frame and its structures, or the recovery spigot used to empty the remaining particulate mixture from the bottom of the bowl upon completion of the desired separation process, the remaining particulate separation occurring by other separation means.

II. SUMMARY OF THE INVENTION

Gold recovery in or near water, as opposed to gold mining, is a process used to recover gold from river sand materials or from gold-bearing sands near a river. It can be performed with a device as simple as a gold pan, which is simply a pan in which potential ore containing materials are placed with water using the concept of specific gravity concentration to move the water and material mixture to separate the heavier gold from the lighter non-gold particles with turbulence applied by movement of the prospector. It can also be conducted on a large scale by gold sluice machines or boxes or with centrifugal separation devices.

Gold sluices use a tilted box with riffles on a flat bottom surface over which the water and material mixture flow, with the riffles providing a plurality of eddies or raised ridges which trap the gold behind the riffle, allowing the lighter non-gold to pass over and out the sluice box along with the water, after which the heavier gold containing material, along with common black sands, are kept for later removal and further classification ultimately leaving behind only the gold particles. Sluice boxes have a top end where raw materials are introduced along with water, and a lower end where the non-gold materials and water are disposed.

Centrifugal devices use a bowl generally having an upper open ridge and a lower bottom surface to spin a mixture of raw material and water with some type of formation on the inner surface of the bowl which is supposed to separate materials by specific gravity, or relative heaviness or density with the lighter non-gold materials rising along the inner surface of the bowl as it spins around a central axis, the lighter materials rising up and over the upper rim of the bowl for disposal, while the heavier gold bearing materials are left on the bottom of the bowl for collection, retention and further separation using a finer separation tool or method. Water is essential to the separation as gold is impervious to water and is therefore unable to float on the water once it has been immersed, wherein other lighter minerals and sand do float or become water bound, which is compelled outward and upward by the spinning of the bowl during operation, thus deriving the generic name of a centrifugal force separation device or classification device.

The purpose of the separation device is to provide an improved centrifugal force separator which provides the improved features a disclosed within the specification and claims. In addition, several improvements to the patent originally issued to the present inventor and his father have been developed over the years which continued use has resulted in the inclusion of the improved features which improve the operation and efficiency of the present embodied device over the prior art.

III. DESCRIPTION OF THE DRAWINGS

The following drawings are submitted with this utility patent application.

FIG. 6 is an upper sectional view of the centrifugal separator device.

Figure 7:
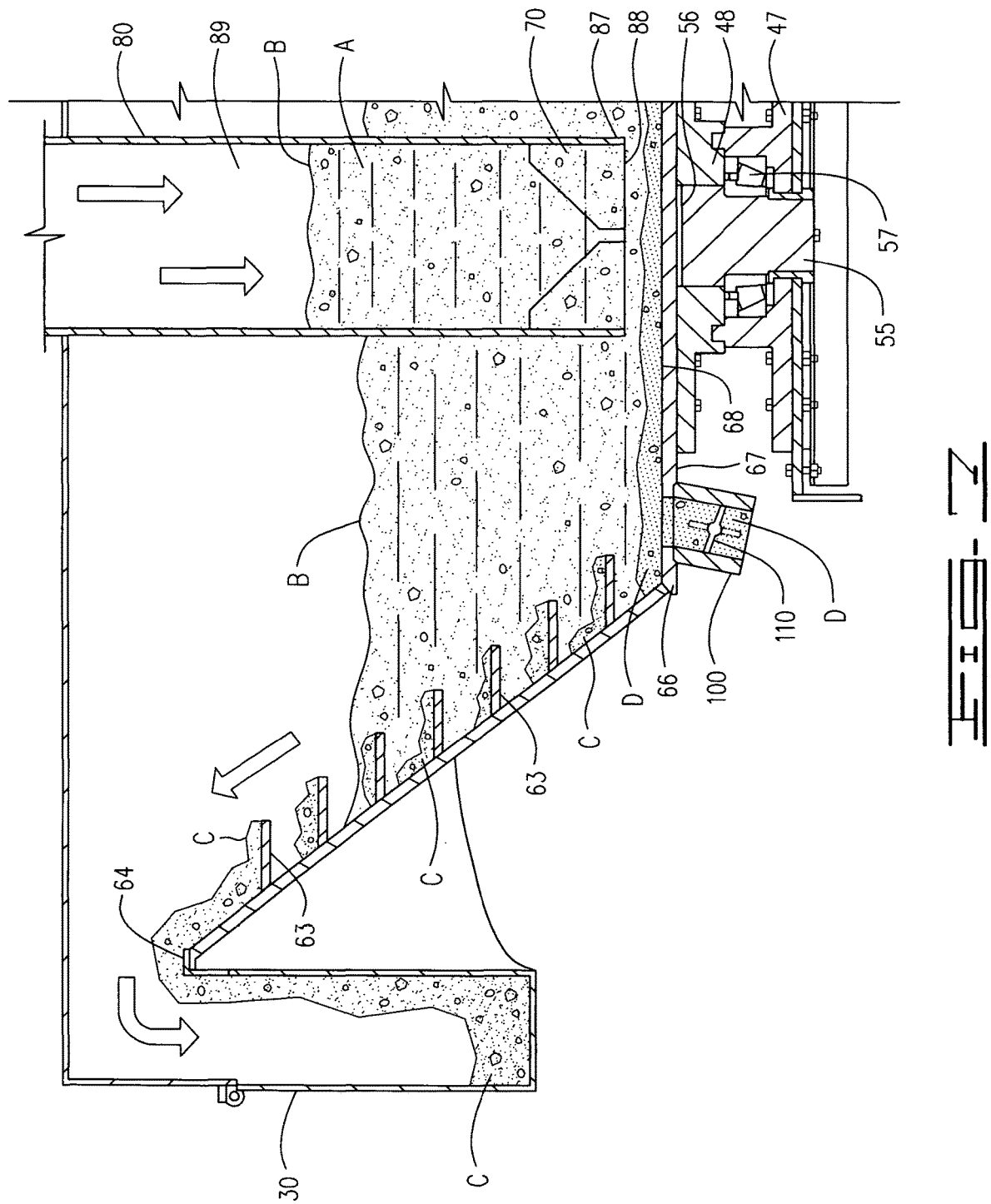

FIG. 7 is a side sectional view of the separator device during the separation process indicating the material flow, the separation of the non-gold bearing materials being spun outward and lifted over the upper lip of the conical bowl by the centrifugal forces applied to the materials and water and further through the inner wall opening into the evacuation flume while the heavier gold-bearing materials remain collected at the bottom of the conical bowl for subsequent removal after the conical bowl is stationary.

IV. DESCRIPTION OF THE PREFERRED EMBODIMENT

A centrifugal separator device 10 for mining gold and heavy metals, as shown in FIGS. 1-6, comprising an outer support frame 20 defining a platform base 21, the outer support frame 20 supporting an elevated upper cylindrical evacuation flume 30 defining an inner wall opening 31 and an exit channel 38, a bowl support frame 40 mounted centrally upon the platform base 21 within the outer support frame 20, a conical bowl 60 having an outward tapered wall 61 extending upward from a lower surface 67 of a flat frame plate 66 mounted upon a vertical drive shaft 55 that extends upward through the bowl support frame 40 within an upper and lower bearing plate 48, 47, the vertical drive shaft compelling rotation of the conical bowl 60 from a power plant 50 at a variable speed, the outward tapered wall 61 defining an inner surface 62 extending a plurality of upward expanding concentric horizontal ridges 63, with an upper surface 68 of the flat base plate 66 defining a center 69, a material drop cylinder 80 suspended across the evacuation flume 30 by a plurality of drop cylinder support members 84, the material drop cylinder 80 defining an upper end 81 attaching a cap 82 and extending an intake chute 83 and a lower end 87 forming a cylinder discharge opening 88 above the flat base plate 66 with a plurality of inner baffles 70 attached to an inner surface 89 of the lower end 87 of the material drop cylinder 80, an angular blade 90 suspended above the conical bowl 60 by a mounting plate 92 removably attached to the plurality of drop cylinder support members 84 and extending within the conical bowl 60 adjacent to the plurality of concentric horizontal ridges 63, each angular blade 90 defining at least one upper cutter 95 and lower cutter 96 and an inwardly directed toe extension 94 to stir and create a chaotic flow of water B and raw material A mixture within the conical bowl 60 as the conical bowl 60 is rotated about the bowl axis a, and a clean-out channel assembly 100 for removal of the gold bearing materials D left behind when the conical bowl 60 is stationary after the water B and lighter waste materials C are perpetually carried up the tapered wall 61 of the conical bowl 60 and deposited within and removed by the evacuation flume 30 during rotation, FIG. 7. The device components that move during operation include the conical bowl 60, its directly anchored components and the rotational drive components of the power plant 50. The other components of the device 10 remain stationary during operation.

Figure 1:
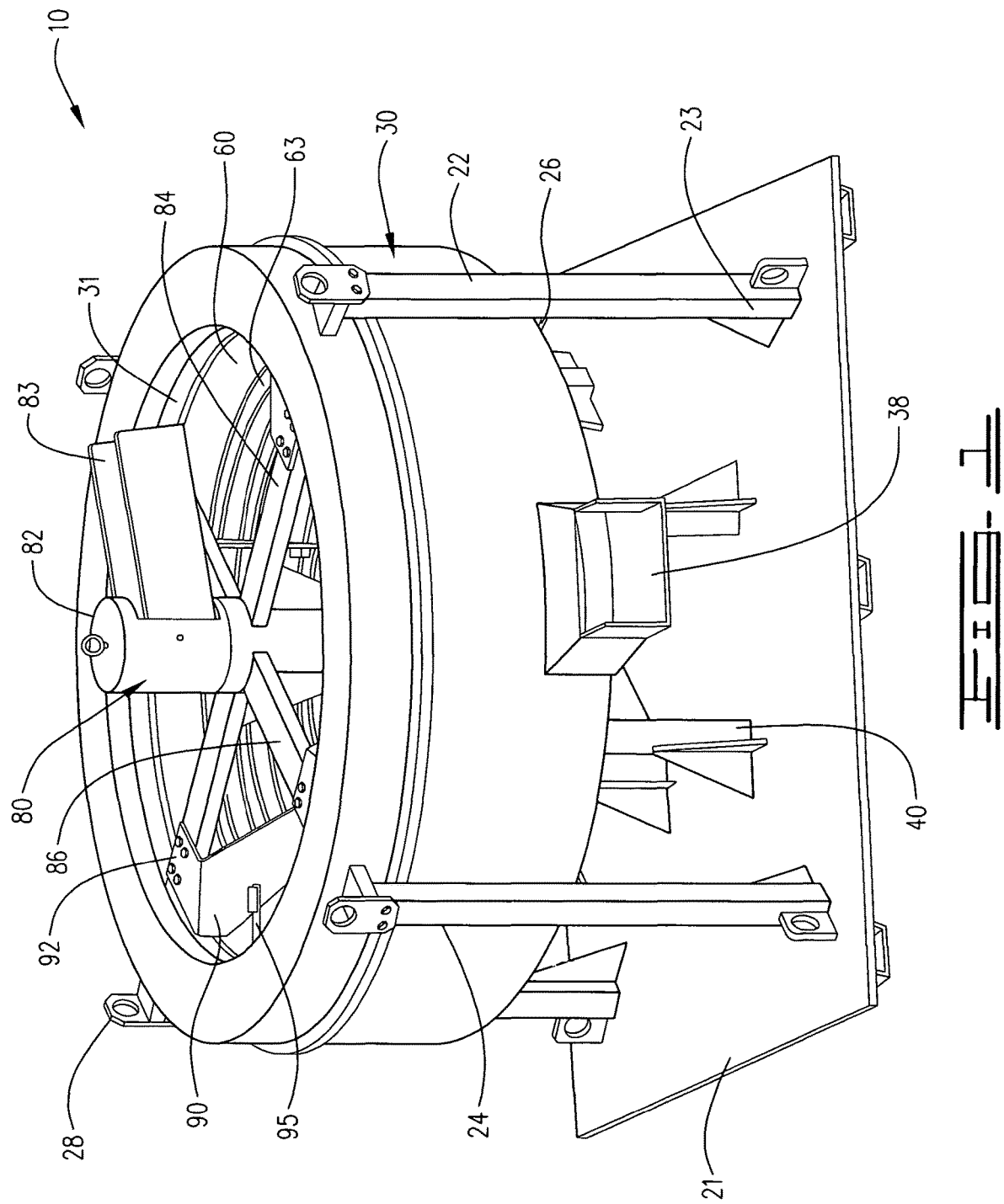
FIG. 1 is a perspective view of the centrifugal separator device.
Figure 3:
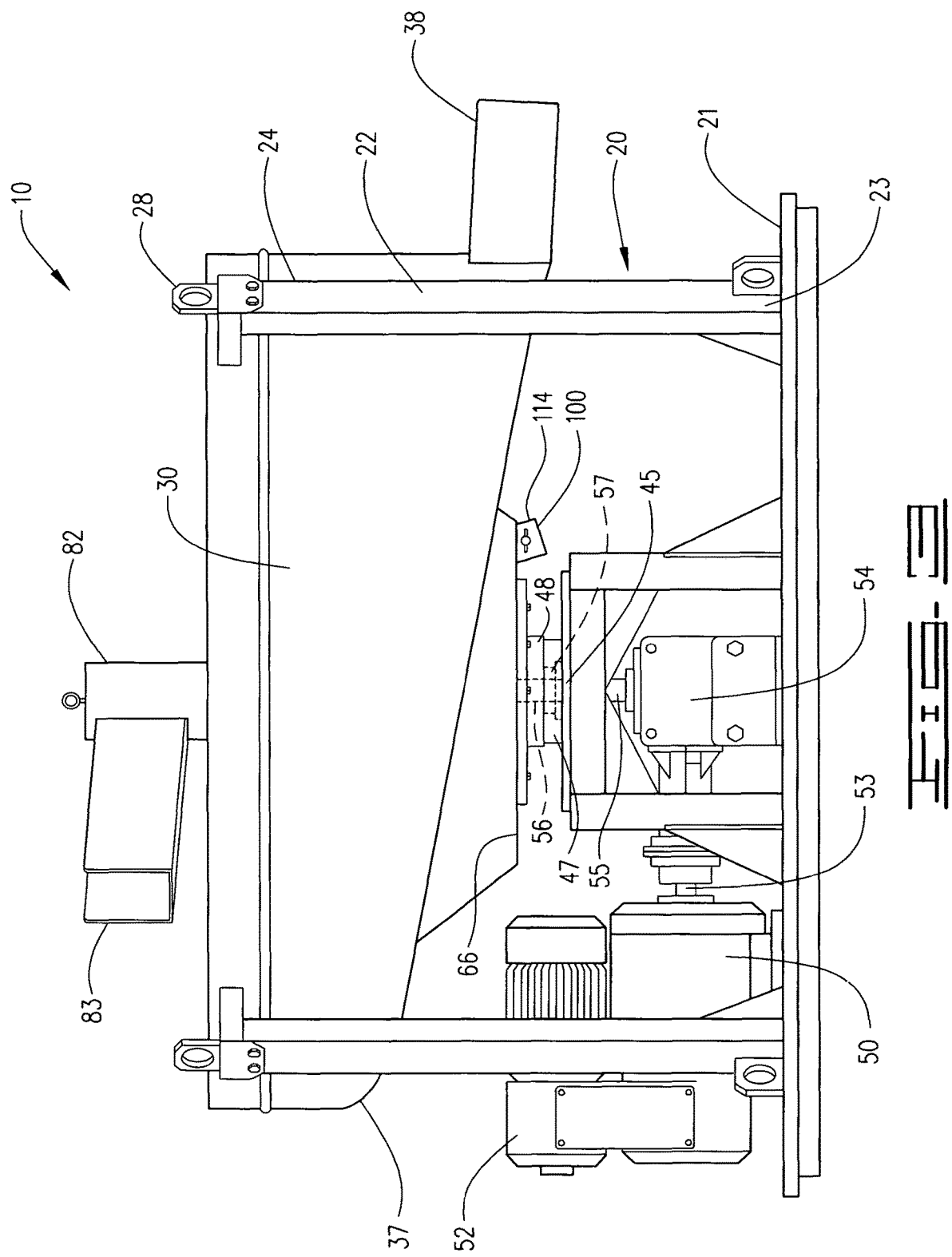
FIG. 3 is a side view of the centrifugal separator device.
Figure 5:
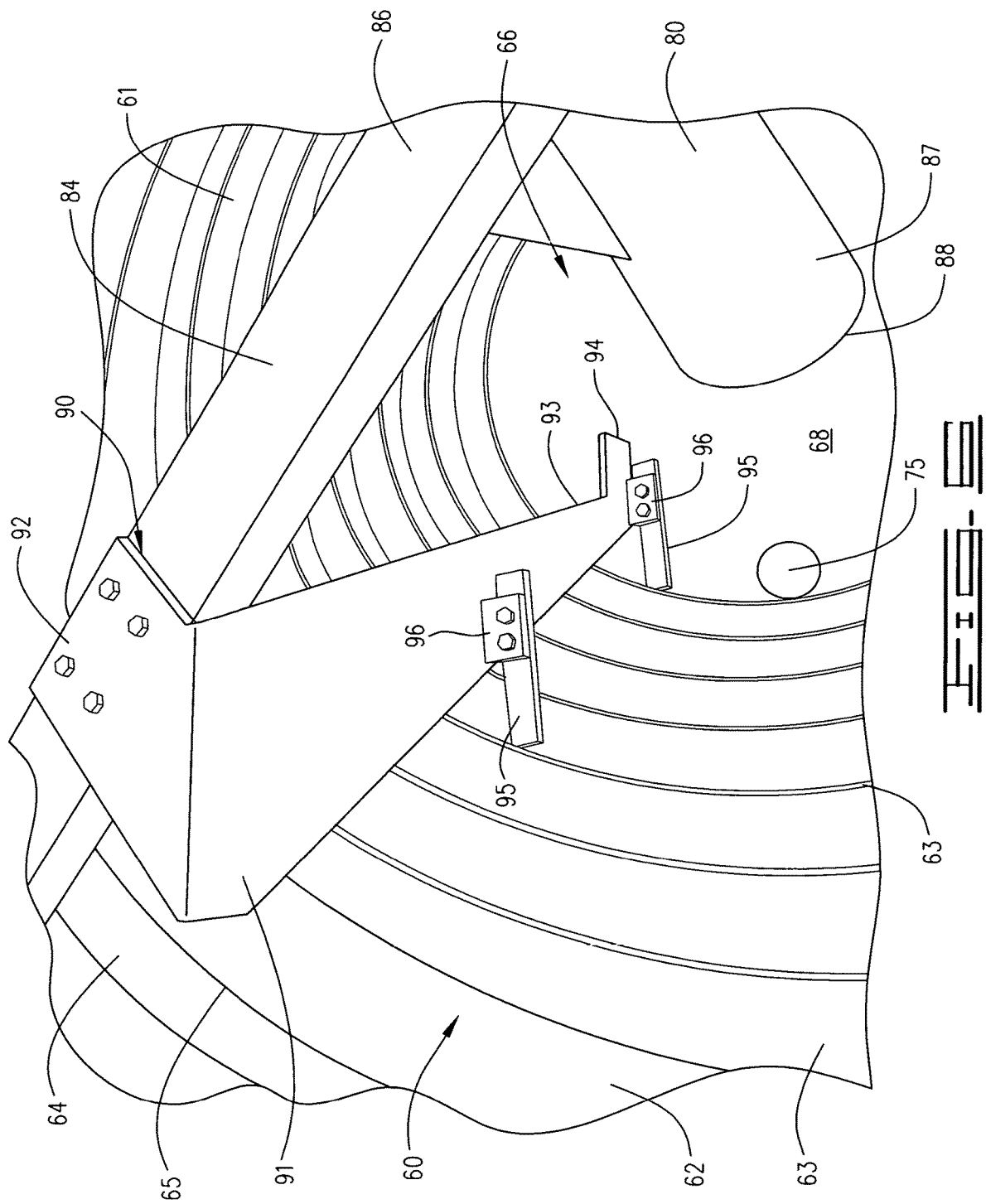
FIG. 5 is a rear perspective cross-sectional view of the centrifugal separator device.

The outer support frame 20, FIGS. 1, 3 and 5, further comprises a plurality of vertical support members 22 defining a lower end 23 attached to the base 21, an upper end 24 attaching to the evacuation flume 30 and an intermediate flume support 26 attached to a sloped base 36 of the evacuation flume 30. An optional plurality of gussets 28 may be respectively attached to the upper ends 24 of each vertical support member 22 to provide a location for a chain to be attached to raise, lower and otherwise move the device 10. The drawing figures depict four vertical support members 22, but the outer support frame 20 may comprise three or more.

Figure 4:
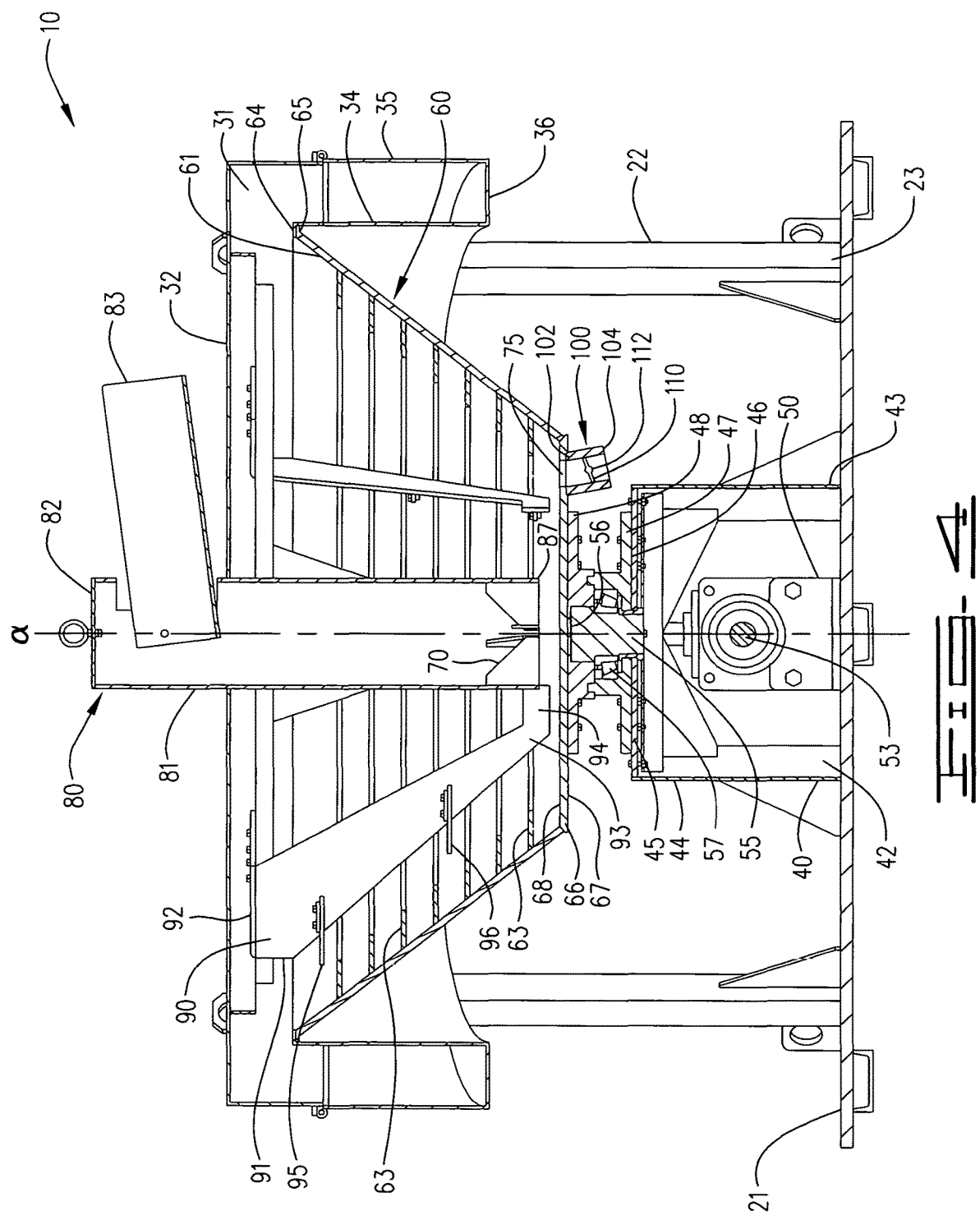
FIG. 4 is a front cross-sectional view of the centrifugal separator device.

The evacuation flume 30, FIG. 4, is circular in shape and connected to all of the vertical support members between the upper ends 24, at a common horizontal location on each vertical support member 22 and conforming locations at the intermediate flume supports 26, the evacuation flume 30 further defining a flat circular hood 32, an outer wall 35 which is also connected to the vertical support members 22, th sloped base 36 extending inward and horizontally from the outer wall 35, an inner wall 34 extending upward from the sloped base 36, the sloped base 36 further defining an apex 37 opposite an exit channel 38 wherein the apex 37 defines a highest point vertically of the sloped base 36 within the evacuation flume 30 and the exit channel 38 is at a lowest vertical point of the evacuation flume 38. The junction of the sloped base 36 and the outer wall 35 is secured to each respective vertical support members 22 at the intermediate flume support 26, most preferably by a bolt or by welding. The hood 32 from the outer wall 35 over the inner wall 34 defines a circular inner wall opening 31 which provides passage of water and materials from the conical bowl 60 into the evacuation flume 30 circumferentially, as will later be described in more detail.

The bowl support frame 40, FIGS. 4-5, further defines a plurality of vertical frame members 42 having respective lower ends 43 attached to the base 21 of the outer support frame 20, with respective upper ends 44 attached to a common frame plate 45. The frame plate 45 has an upper surface 46 upon which an upper bearing plate 48 and lower bearing plate 47 are mounted, the upper and lower bearings 48, 47, including a bearing 57 attached to the vertical drive shaft 55 which allows rotation of the vertical drive shaft within the assembled upper and lower bearing plates 48, 47 mounted to the frame plate 45 and ultimately the conical bowl 60 on a horizontal plane. The upper bearing plate 48 and bearing 49 secure to the vertical drive shaft 55 which further freely rotates upon the lower bearing plate 47 and the frame plate, which do not rotate, the vertical drive 55 shaft having an upper end 56 further attaching to a lower surface 67 of the flat base plate 66 of the conical bowl 60, providing the conical bowl 60 with rotation on a horizontal plane as directed by the power plant 50.

The power plant 50, FIGS. 3-4, is a local electrical or combustion engine operated by a local control panel 52 providing variable speed rotation to a horizontal drive shaft 53 attached to a transmission 54 below the frame plate 45, and preferably having the transmission 54 anchored to the base 21 of the outer support frame 20, the transmission 54 further integrated with the vertical drive shaft 55 which attaches the upper end 56 of the vertical drive shaft 55 to the lower surface 67 of the flat base plate 66 of the conical bowl 60. The power plant 50 operates the horizontal drive shaft 53 and vertical drive shaft 55 to create rotation of the conical bowl 60 at a selected speed as determined by the operator to optimize the operation of the device 10 to efficiently expel the waste materials from the conical bowl 60 during rotation while retaining the gold bearing materials within the conical bowl 60 during operation. The operator will be able to determine, upon learning the operation of the device 10 and also after analyzing the variable consistency of the raw materials being run through the device 10 what the optimal rotational speed of the conical bowl 60 would be from a subjective standpoint.

The conical bowl 60, FIGS. 2 and 4-6, further defines the upward and outward tapered wall 61 which provides the inner surface 62 from which the upward expanding concentric horizontal ridges 63 are formed from the flat base plate 66 upward to an upper perimeter ridge 65 extending outward an upper lip 66. When installed, the upper lip 66 along the upper perimeter edge 65 of the conical bowl 60 extends outward over the inner wall 34 of the evacuation flume 30 over the inner wall opening 31, to receive waste materials C and water B expelled over the upper lip 64 during rotation of the conical bowl 60 to be outwardly expelled and horizontally dropped into the evacuation flume 30, while avoiding contact between the upper lip 66 and tapered wall 61 of the rotating conical bowl 60 and the inner wall 34 and hood 32 of the evacuation flume 30. The conical bowl 60 may further defines the plurality of inner baffles 70 forming a plurality of vertical blade shaped extension placed upright from the center 69 and upper surface 68 of the flat base plate 66. The plurality of upward extending baffles 70 provides a collective outer diameter which is smaller than an inner diameter of the cylinder discharge opening 88 in a second embodiment indicated below.

The materials drop cylinder 80 is suspended from the evacuation flume 30 and outer support frame 20 by the plurality of drop cylinder support members 84, FIGS. 1-2 and 4-6, defining an inner end 86 which commonly attach to the upper end 81 of the materials drop cylinder 80 and an outer end 85 which respectively secure radially outward and horizontally to the evacuation flume 30 with the outer ends 85 directly attached to respective upper ends 24 of the vertical support members 22. The drawing indicate that there are four drop cylinder support members 84, but there should be no less than three installed within the device 10 to provide ample radial support. The material drop cylinder 80 further defines the cap 82 including the intake chute 83 which channels a flow of the raw materials A into the material drop cylinder 80 and directs the raw materials A to the cylinder discharge opening 88 at a lower end 87 of the material drop cylinder 80. Inside the lower end 87 of the materials discharge tube 80, a first embodiment provides the baffles 70 attached to the inner surface 89, the baffles 70 being inwardly directed over the center 69 of the flat base plate 66 of the conical bowl 60. In a second embodiment, the cylinder discharge opening 88 has the inner diameter larger than the outer diameter of the collective upward extending baffles 70 which are attached to the center 69 and upper surface 68 of the flat base plate 66 in a manner avoiding contact of the rotating upward extending baffles 70 with the lower end 87 of the materials drop cylinder 80 as the upward extending baffles 70 are intended to encroach within the cylinder discharge opening 88 to completely evacuate and outwardly compel the raw materials A that could be contained or possibly lodged within the materials drop cylinder 80 during operation.

Figure 2:
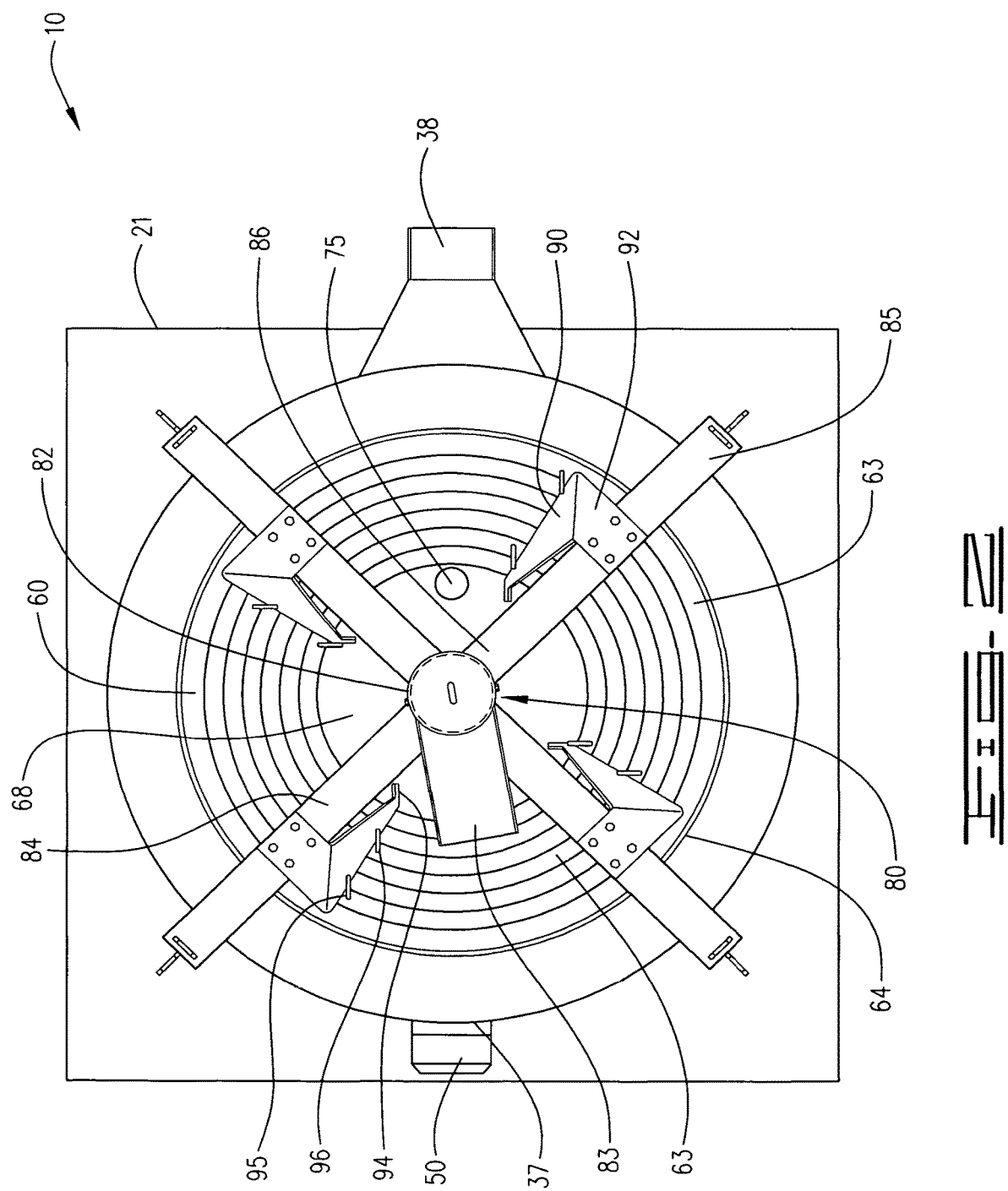
FIG. 2 is a top view of the centrifugal separator device.

The angular blades 90, shown in FIGS. 1-2, as four, should correspond in number of angular blades 90 to the number of drop cylinder support members 84, with no less than three included within the device 10. Each angular blade 90 further defines an upper end 91 attached to the horizontal mounting plate 92, which removably secure each angular blade 90 to a respective drop cylinder support member 84, and a lower end 93 forming the inward directed toe extension 94 FIG. 6. When properly installed tangentially to the tapered wall 61, FIGS. 2 and 6, the angular blade 90 should vertically conform parallel and in proximity to the incline of the concentric horizontal ridges 63 extending from the tapered wall 61 of the conical bowl 60 within which each angular blade 90 does not come into contact with the concentric horizontal ridges 63 as they extend concentrically outward from the inner surface 62. The toe extension 94 is directed obliquely from the center 69 of the flat base plate 66 of the conical bowl 60 outside the cylinder discharge opening 88 of the material drop cylinder 80. Between the upper end 91 and lower end 93 of each angular blade 90 are two or more outwardly extending cutters 95, 96, shown as an upper cutter 95 and lower cutter 96, which are directed between different concentric horizontal ridges 63 of the inner surface 62 of the tapered wall 61, removing particulate materials which tend to get caught between the concentric horizontal ridges 63 during operation, maintaining the inner wall 62 of the conical bowl 60 to be repeatedly cleaned during operation. Optimally, one cutter 95, 96, from each angular blade 90 corresponds to one location between adjacent concentric horizontal ridges 63, FIG. 2. The cutters 95, 96 are also preferably removably attached to each angular blade 90 so that they may be replaced when they become worn due to the perpetual friction of each cutter 95, 96 with raw material A located between the concentric horizontal ridges 63. There must be absolutely no contact between the angular blade 90 and its attached components and the conical bowl 60 and its attached components during operation as this contact or friction would destroy the device 10 and result in possible deadly injury, due to the hazards presented by high speed rotation of a large scale device, operationally design to have an overall device gross weight of over a ton.

The clean-out channel assembly 100 is attached to a clean-out channel opening 75 formed within the flat base plate 66 of the conical bowl 60, FIGS. 3-4 and 7. The location of the clean-out channel 100 should be measured by engineered specifications to prevent imbalance of the conical bowl 60, which needs to be critically balanced to avoid an imbalance during rotation, especially at high speeds. The clean-out channel assembly 100 should therefore be equal to or very close to the weight of the removed portion of the flat base plate 66 from the clean-out channel opening 75 if possible. The clean-out channel assembly 100 further comprises an upper opening 102 and an internally threaded lower discharge 104 between which is placed an inner butterfly valve plate 110 suspended within the clean-out channel assembly 100 by a horizontal valve bar 112 defining an external valve bar handle 114 to manipulate the butterfly valve plate 110 from a closed position to an open position. This clean-out valve assembly 100 is used to evacuate the gold bearing materials D from the conical bowl 60 once the conical bowl 60 is stationary after a prolonged use. A plug may be installed within the inner threaded lower discharge 104 for additional containment during operation. Once the butterfly valve plate 110 is opened, water B may be used to wash out the remnant contents of the conical bowl 60, which hopefully contains the gold bearing materials D harvested from the raw materials A introduced into the device 10 after having expelled the waste materials C during operation of the device 10. Once the gold bearing materials D are removed from the conical bowl 60, collected and sent off for further classification and separation, the butterfly valve plate 110 is closed and the device 10 is restored for further operation.

In field testing, the current centrifugal separator device 10 has demonstrated the ability to collect and retain flower gold, which are those gold particles measuring less than 200 grit and greater, and also provide for collection of the gold bearing materials D from within the conical bowl 60 in a time of less than 15 minutes of non-operational down time. In order for this optimal operation to be obtained, the appropriate sized device 10 is necessary, the appropriately rated power plant 50 is required, and the knowledge of the operation of the device 10 at a desired rotational speed based subjectively on the raw materials A being separated must be gained.

The entire centrifugal separator device 10 should be made from heavy iron, steel or other suitable metal product and be resistant to water, which is going to be present nearly all the time during operation and use. A corrosion resistant coating is also recommended, although repeated application would be required due to the heavy amount of exposure to particulate friction of the raw materials A and the ever-presence of water B. The optimal size of the upper perimeter edge 65 of the conical bowl 60 would be between 2 and 7 feet, with the over all weight of the device 10 at over a ton. Great care should be rendered during construction of selection of the components involved in the centrifugal separator device 10, especially those used in support structures and rotational components, including the conical bowl 60, especially involving the harmonic balance of the conical bowl to avoid irregular non-harmonic vibrations and counter torsional and resonance vibrations caused by mismatched or misplaced component structures which can pose a safety hazard with results as severe as death to a proximal builder or operator.

The improvements over the prior art and the present device 10 which enhance the efficiency of the device over the prior art and allow for recovery of greater amounts of gold, including smaller particles of gold. The first improvement includes the placement of the of the hood 32 over the evacuation flume 30 which eliminates "throw" of waste materials and water during operation and rotation of the conical bowl. The waste materials C and water B are contained to eliminate the waste materials C from being expelled into the environment within which the device 10 is operated and to collect and divert the waste materials C and water B for controlled disposal through the exit channel. The second improvement is the cap 82 over the material drop cylinder 80 which prevents materials from being introduced into the conical bowl 60 not directed through the cylinder discharge opening 88. By requiring the raw materials A to be introduced only through the material drop cylinder 80, the raw materials incur two important physical occurrences. First, the raw materials A are chopped and rendered into particulate by the action of the rotating baffles 70 attached to the upper surface 68 of the flat base plate 66 of the conical bowl 60 during operation (another improvement over prior art discussed later). Second, by being discharged from the cylinder discharge opening 88, the now rendered particles of raw material A are immersed in water B which is also added to the material drop cylinder 80 during operation, which causes the particles of raw material A to become wet and also agitated to become wetter as the water B and raw materials A are stirred by interaction of the spinning conical bowl 60 and the stationary angular blades 90. It is important to note that gold does not become wet, being impervious to water. It may be wet on the outside, but it does not become wet on the inside like other minerals. The waste materials C do become wet, as a general rule, with the exception of some other metals, but they are generally lighter than gold. If they are not lighter than gold, they are desirable for separation and classification having value over waste materials C. Therefore, the heavy and dense gold will sink to the bottom of a water and material mixture, while other materials may be easily cast or floated above water, especially water in motion. This principal is confirmed by a simple gold pan operation, which is readily know by those skilled in the art of gold mining. A third improvement over prior art lies in the application of the baffles 70 to the upper surface 68 of the flat base plate 66 of the conical bowl 60, as previously mentioned, during operation and separation. This disruptive motion clears and breaks down raw materials A deposited within the material drop cylinder 80. A fourth improvement to the device over prior art is due to the cutters 95, 96, being attached to the angular blade 90 and each cutter's intrusion between adjacent concentric horizontal ridges 63 of the conical bowl 60. These stationary cutters 95, 96, continuously clear waste material C build-up as the waste material C "climbs" up the tapered wall 61 of the conical bowl 60 as it spins, the "climb" caused by the centrifugal forces applied to the water B and waste materials C. The waste materials C are continuously knocked off of the tapered wall 61 and concentric horizontal ridges 63 back into the conical bowl 60 to avoid clumping of the raw materials on their way up and out of the conical bowl 60. This recycling also breaks up remnant particles of gold which could be trapped within the waste materials C for a secondary separation opportunity. A fifth improvement is the inclusion of the inner butterfly valve plate 110 within the clean-out channel opening 100, which allows for a gradual and intentional discharge and collection of the gold bearing materials D while the conical bowl 60 is stationary. This prevents spillage and allows for a controlled flow of gold bearing materials D and water B used to wash out the conical bowl 60.

While the centrifugal separator device 10 has been particularly shown and described with reference to a preferred embodiment thereof, it will be understood by those skilled in the art that changes in form and detail may be made therein without departing from the spirit and scope of the invention.

What is claimed is:

1. A centrifugal separator device for mining gold and heavy metals comprising:
   an outer support frame defining a platform base and a plurality of vertical supports attached to said platform base;
   an elevated upper cylindrical evacuation flume defining an inner wall opening and an exit channel;
   a bowl support frame mounted centrally upon said platform base and centrally located within said plurality of vertical supports and said evacuation flume;
   a conical bowl defining an outward tapered wall and an inner surface with a plurality of upward expanding concentric horizontal ridges extending from said inner surface, a flat base plate defining a lower surface, a clean-out channel opening and an upper surface defining a center and a central axis;
   a power plant defining a control panel, a horizontal drive shaft, a transmission and a vertical drive shaft extending upward from said transmission, an upper bearing plate attached directly to said center of said lower surface of said flat base plate of said conical bowl, a lower bearing plate mounted centrally upon a flat plate of said bowl support frame, and a bearing between said upper and lower bearing plates to provide rotation between said plates, said bearing attached to said vertical drive shaft which is further secured within said upper bearing plate, compelling rotation of said conical bowl from said power plant at a variable speed;
   a material drop cylinder suspended across said evacuation flume by a plurality of drop cylinder support members defining respective inner ends attached to said material drop cylinder and outer ends respectively attached to an upper end of said vertical supports of said outer support frame, said material drop cylinder defining an upper end attaching a cap and extending an intake chute and a lower end forming a cylinder discharge opening above said center of said upper surface of said flat base plate;
   a plurality of angular blades suspended above said conical bowl by a respective mounting plate removably attached to a respective drop cylinder support member and extending within said conical bowl adjacent to said plurality of concentric horizontal ridges, each angular blade further defining at least one upper cutter and lower cutter and an inwardly and obliquely directed toe extension to stir and create a chaotic flow of water and raw material mixture within said conical bowl introduced through said material drop cylinder while said conical bowl is rotated about said central axis at a selected speed; and
   a clean-out channel assembly defining an inner butterfly valve plate and an upper opening in communication with said clean-out channel opening for removal of substrate gold bearing materials left behind after water and waste materials are evacuated upon said outward tapered wall of said conical bowl into said evacuation flume during rotation of said conical bowl after said conical bowl is stationary, said water and lighter waste materials perpetually and systematically carried up said outward tapered wall during rotation by centrifugal forces applied to said water and said waste materials, wherein said power plant and said conical bowl are the only moving parts of said centrifugal separator device which are in motion during operation of said device.

2. The centrifugal separator device of claim 1, said outer support frame further comprising:
   each of said plurality of vertical supports defining a lower end attached to said platform base; and an upper end attaching to said evacuation flume an outer end of each said drop cylinder support member and an intermediate flume support also attached to said evacuation flume with gussets respectively attached to each said upper end of each said vertical support to provide a location for a chain to be attached to raise, lower and otherwise move said centrifugal separator device, wherein said outer support frame includes no less than three of said vertical supports.

3. The centrifugal separator device of claim 1, further comprising:
   said evacuation flume is circular in shape and connected to all of said vertical supports at an upper end said respective vertical supports at a common horizontal location on each said vertical support;

said evacuation flume further defines a flat circular hood, an outer wall respectively connected to each said vertical support, a sloped base extending inward and horizontally from said outer wall, an inner wall extending upward from said sloped base, the sloped base further defining an apex opposite said exit channel of said elevated upper cylindrical evacuation flume, wherein said apex defines a vertically high point of said sloped base within the evacuation flume and said exit channel is at a vertically lowest point of said evacuation flume, said sloped base and said outer wall secured to each of said vertical supports independently at an intermediate flume support, said flat circular hood extending from said outer wall over said inner wall and defining a circular inner wall opening providing uniform passage of said water and said waste materials from said conical bowl into said evacuation flume circumferentially.

4. The centrifugal separation device of claim 1, said bowl support frame further comprising:
   a plurality of vertical frame members having respective lower ends attached to said platform base of said outer support frame with respective upper ends attached to a common frame plate, said frame plate defining an upper surface upon which said lower bearing plate is attached with said upper bearing plate rotatably mounting upon said lower bearing plate within which said bearing is located, and
   said bearing is attached directly to said vertical drive shaft, allowing rotation of said vertical drive shaft between said upper and lower bearing plates and said vertical shaft to rotate said conical bowl on a horizontal plane around said conical bowl central axis as directed by said power plant.

5. The centrifugal separator device of claim 1, said material drop cylinder further comprising:
   an inner surface;
   said upper end attaching said cap and said intake chute; and
   a plurality of fixed inner baffles attached to said inner surface of said material discharge cylinder at said cylinder discharge opening above said center of said upper surface of said flat base plate.

6. The centrifugal separator device of claim 1, said material drop cylinder further comprising:
   an inner surface;
   said upper end attaching said cap and said intake chute; and
   a plurality of upward extending baffles attached to said center of said upper surface of said flat base plate while avoiding contact of said plurality of upward extending baffles during rotation with said inner surface of said cylinder discharge opening of said lower end of said material drop cylinder during operation of said centrifugal separator device, said plurality of upward extending baffles encroaching within said cylinder discharge opening to completely evacuate and outwardly compel said raw materials contained or possibly lodged within said materials drop cylinder during operation, said cylinder discharge opening defining an inner diameter greater than an outer diameter of said plurality of upward extending baffles.

7. The centrifugal separator device of claim 1, said conical bowl further comprising:
   said outward tapered wall having said inner surface from which said upward expanding concentric horizontal ridges are formed from said flat base plate upward to an upper perimeter ridge extending outward and defining a flat upper lip around an upper perimeter edge, said flat upper lip extending outward over an inner wall of said evacuation flume over said inner wall opening of said evacuation flume to receive said waste materials and water expelled over said flat upper lip during rotation of said conical bowl which are outwardly expelled and horizontally dropped into said evacuation flume while avoiding contact between said flat upper lip and said inner wall of said evacuation flume.

8. The centrifugal separator device of claim 1, each of said plurality of angular blades further comprising:
   each of said angular blades vertically conforms parallel and in proximity to said concentric horizontal ridges extending from an outward tapered wall of said conical bowl without contact with said concentric horizontal ridges as said concentric horizontal ridges extend concentrically outward from said inner surface;
   said toe extension is angled obliquely from said center of said flat base plate of said conical bowl and outside said cylinder discharge opening of said material drop cylinder; and
   each upper cutter and lower cutter are directed between different concentric horizontal ridges of said inner surface of said outward tapered wall, removing particulate materials which may become trapped between said concentric horizontal ridges during operation, maintaining said inner wall of said conical bowl to be repeatedly cleaned during operation, said upper and lower cutters removably attached to each angular blade to be replaced when worn due to applied perpetual friction of each of said cutters with said raw material, wherein said placement of each of said angular blades avoids contact with said conical bowl during operation which would destroy said centrifugal separator device or result in possible deadly injury due to hazards presented by high speed rotation of said centrifugal separator device intended to have an overall device gross weight of over a ton.

9. The centrifugal separator device of claim 1, said clean-out channel assembly further comprising:
   an upper opening and an internally threaded lower discharge between which is adjustably placed an inner butterfly valve plate suspended within said clean-out channel assembly by a horizontal valve bar defining an external valve bar handle to manipulate the butterfly valve plate from a closed position to an open position, wherein said clean-out valve assembly allows for evacuation of said gold bearing materials from said conical bowl which are directed and collected upon said upper surface of said flat base plate during operation, said evacuation of said gold bearing materials conducted once said conical bowl is stationary after prolonged operation, wherein said butterfly valve plate is opened while water is used to wash out remnant substrate gold bearing materials from within of said conical bowl harvested from said raw materials introduced into said conical bowl after said centrifugal separator device has expelled said waste materials and water during operation, thereafter said butterfly valve plate is returned to said closed position prior to said centrifugal separator device being restored to further operation; and said clean-out channel assembly is located to avoid imbalance of said conical bowl during rotation at high speeds, wherein said clean-out channel assembly is equal to a weight of a removed portion of said flat base plate from said clean-out channel opening.

* * * * *